United States Patent [19]

Lo Conti

[11] 4,406,942
[45] Sep. 27, 1983

[54] OVERHEATING PREVENTION SPACER FOR AUTOMATIC COFFEE MAKER

[76] Inventor: Vito Lo Conti, Iroquois Ave., Palisades, N.Y. 10964

[21] Appl. No.: 264,971

[22] Filed: May 18, 1981

[51] Int. Cl.³ .................. H05B 3/20; F24C 15/10
[52] U.S. Cl. ............................... 219/283; 126/215; 99/288; 219/433; 219/429; 219/434
[58] Field of Search .............. 219/521, 385, 386, 430, 219/444, 283, 432, 433, 434, 443, 218, 429, 455, 459; 99/288; 126/211, 212, 215, 390, 214 C, 220; 312/248

[56] References Cited

U.S. PATENT DOCUMENTS

| 126,647 | 5/1972 | Otis | 16/297 |
| 1,276,795 | 8/1918 | Nelson | 126/214 C |
| 2,571,741 | 10/1951 | Mayer | 126/215 |
| 3,385,201 | 5/1968 | Martin | 219/283 |
| 3,687,127 | 8/1972 | Mossman | 126/215 |
| 4,158,125 | 6/1979 | Jones | 219/433 |
| 4,170,931 | 10/1979 | Fajans | 219/433 |

FOREIGN PATENT DOCUMENTS 77785 10/1918 Switzerland .............. 126/215

*Primary Examiner*—B. A. Reynolds
*Assistant Examiner*—Teresa J. Walberg
*Attorney, Agent, or Firm*—Brumbaugh, Graves, Donohue & Raymond

[57] ABSTRACT

A spacer for positioning intermediate the bottom of a beverage container and a planar heating surface of an electrically heated hot plate of a coffee maker is formed as a continuous heat conductive wire element positioned to rest immediately above and in contact with the planar surface to support a beverage container and to space said container a small distance above the heat source. The spacer may be fabricated of a stainless steel wire of suitable dimension such as one of approximately 1/16 of an inch in diameter, and may be bent in a form which provides uniform support for a coffee pot over the surface of the hot plate. The spacer is secured in place by means of lateral arms which are attached by means of a hinge to the base of the apparatus so that the spacer can be made to swivel upwardly about the hinge and out of the way to facilitate cleaning or to permit the option of nonuse of the spacer if so desired. By use of the appropriate detent means, the spacer can be urged in an operative, or alternatively, in an inoperative position.

2 Claims, 1 Drawing Figure

U.S. Patent    Sep. 27, 1983    4,406,942
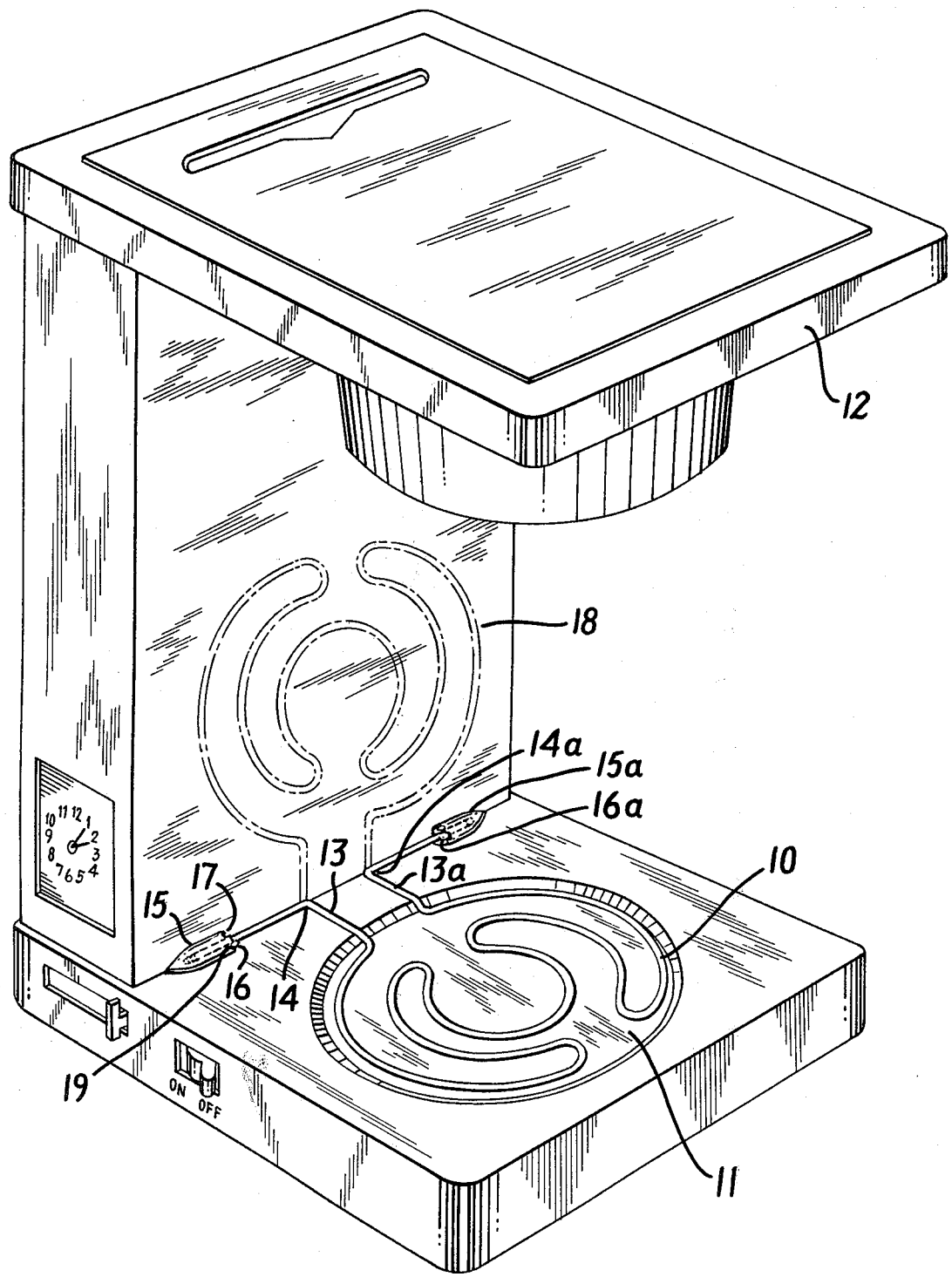

OVERHEATING PREVENTION SPACER FOR AUTOMATIC COFFEE MAKER

This invention relates to a spacer for use on automatic beverage makers such as coffee makers as well as other devices which employ a hot plate or similar source of heat for maintaining a beverage at a constant elevated temperature.

Present day coffee makers generally include a thermostatically controlled hot plate which is used to maintain coffee at the desired elevated temperature for consumption. After brewing, the coffee is placed in a pyrex or metal coffee pot and placed over the hot plate. The hot plate supplies heat sufficient to maintain the beverage at a temperature desired for consumption.

It has been found in practice that when the amount of beverage such as coffee in the pot is reduced to a minimum, so that the pot is nearly empty, there is a substantial danger that the coffee will overcook. If left too long, all moisture will evaporate, and the pot then burn. In addition, when the amount of coffee is small, overcooking develops a bad taste in the coffee.

It has now been found that overcooking and burning can be avoided by providing for a spacer in accordance with this invention to be positioned intermediate the coffee pot and the hot plate. The spacer of the present invention may be fabricated of a stainless steel wire of suitable dimension such as one of approximately 1/16 of an inch in diameter, and may be bent in a form which provides uniform support for a coffee pot over the surface of the hot plate. It is also desirable to secure the spacer in place by means of lateral arms which are attached by means of a hinge to the base of the apparatus so that the spacer can be made to swivel upwardly about the hinge and out of the way to facilitate cleaning or to permit the option of nonuse of the spacer if so desired. By use of the appropriate detent means, the spacer can be urged in an operative, or alternatively, in an inoperative position.

The invention is further described with reference to the single drawing appended hereto. Referring to the drawing, the spacer 10 is shown in operative position over the hot plate portion 11 of an automatic coffee maker shown generally at 12. The spacer 10 is fabricated preferably from a stainless steel wire and is provided with a pair of laterally extending arms 13 and 13a, which after right angle bends at 14 and 14a are slideably engaged with hinge means 15 and 15a.

In use, a pyrex or metal coffee pot is placed over the hot plate 11 and spacer 10, and receives coffee in a known manner from the automatic coffee maker 12. Use of the spacer as indicated preferably prevents coffee from overcooking or burning but at the same time will keep coffee hot enough to meet the requirements of the consumer.

Should it become necessary, the spacer 10 may be pivoted upwardly about the hinges 15 and 15a to a substantial vertical position as shown in the dotted lines at 18. Furthermore, should it be desired to remove the spacer completely from the automatic coffee maker, the arms 13 and 13a are moved towards each other by compression to disengage the arms from the hinges 15 and/or 15a. In this regard, it is noted that the spacer 10 is preferably fabricated of a wire of sufficient resilience that it will return to the form shown after compression and may even contain sufficient resilience to continually urge the arms 13 and 13a outwardly when the device is in place, thus maintaining an engaging relationship with the hinges 15 and 15a by virtue of a slight degree of tension.

In an alternate preferred embodiment, the arm portions 13 and 13a are provided with a first projection 16 and 16a at a point near their terminus. The projection is designed to cooperate with the cutout portions 17 and 19 in the hinge 15, for example, and with similarly placed cutout portions on hinge 15a. These cutout portions 17 and 19, in cooperation with the fixed projection 16, serve as detents and are used to maintain the vertical, or alternatively, the horizontal positioning of the spacer.

I claim:

1. In an automatic coffee maker having an electrically heated hot plate having a planar heated surface adapted to support a coffee pot for maintaining a beverage at a constant elevated temperature, the improvement comprising a spacer positioned intermediate the pot and the planar surface of a hot plate to prevent excessive heating of coffee in the pot, the spacer comprising a continuous heat conductive wire element shaped to rest immediately above and in contact with the planar surface of the heat source to support a coffee pot and to space the pot at a small distance above the heat source, arm portions on the wire element extending laterally away from the hot plate in one direction, the arm portions being retained in pivotal retention in hinge means on said hot plate, the wire element being resilient, and wherein the wire element, when positioned in either vertical or horizontal position, is under tension sufficient to exert slight pressure against the hinges to retain the wire element in position, whereby the spacer is held in place over the hot plate when the spacer is in operating position and whereby the spacer can swivel upwardly to an approximately vertical position to permit cleaning of the surface of the hot plate or use of the surface without the spacer.

2. The device of claim 1, wherein the hinge is provided with at least two detent portions, one urging positioning of the spacer in the horizontal operative position and the other urging the spacer to maintain a vertical position.

* * * * *